United States Patent
Ito et al.

(10) Patent No.: US 10,914,014 B2
(45) Date of Patent: Feb. 9, 2021

(54) ALKALINE WATER ELECTROLYSIS DIAPHRAGM AND METHOD OF MANUFACTURING SAME

(71) Applicants: KAWASAKI JUKOGYO KABUSHIKI KAISHA, Kobe (JP); DE NORA PERMELEC LTD, Fujisawa (JP); THYSSENKRUPP UHDE CHLORINE ENGINEERS (JAPAN) LTD., Tokyo (JP)

(72) Inventors: Takafumi Ito, Kakogawa (JP); Ikuo Shimomura, Kakogawa (JP); Yuji Kamei, Himeji (JP); Akiyoshi Manabe, Yokohama (JP); Akihiro Kato, Fujisawa (JP); Terumi Hashimoto, Kurashiki (JP)

(73) Assignees: KAWASAKI JUKOGYO KABUSHIKI KAISHA, Kobe (JP); DE NORA PERMELEC LTD, Fujisawa (JP); THYSSENKRUPPP UHDE CHLORINE ENGINEERS (JAPAN) LTD., Tokyo (JP)

(*) Notice: Subject to any disclaimer, the term of this patent is extended or adjusted under 35 U.S.C. 154(b) by 429 days.

(21) Appl. No.: 15/737,451

(22) PCT Filed: May 16, 2016

(86) PCT No.: PCT/JP2016/002378
§ 371 (c)(1),
(2) Date: Dec. 18, 2017

(87) PCT Pub. No.: WO2016/203701
PCT Pub. Date: Dec. 22, 2016

(65) Prior Publication Data
US 2018/0171494 A1 Jun. 21, 2018

(30) Foreign Application Priority Data
Jun. 16, 2015 (JP) ................. 2015-121129

(51) Int. Cl.
*C25B 13/02* (2006.01)
*C25B 13/08* (2006.01)
*C25B 1/10* (2006.01)

(52) U.S. Cl.
CPC ............. *C25B 13/02* (2013.01); *C25B 1/10* (2013.01); *C25B 13/08* (2013.01); *Y02E 60/36* (2013.01)

(58) Field of Classification Search
CPC ......... C25B 13/00; C25B 13/02; C25B 13/04; C25B 13/08; H01M 2/00; H01M 2/14; H01M 2/16–2/1693; H01M 2/18
See application file for complete search history.

(56) References Cited

U.S. PATENT DOCUMENTS

2011/0104474 A1* 5/2011 Liu .................. H01G 9/025
428/322.7
2011/0171377 A1* 7/2011 Mues ................ B01D 67/0011
427/180

(Continued)

FOREIGN PATENT DOCUMENTS

JP H09-313905 A 12/1997
JP 2008-144262 A 6/2008
(Continued)

OTHER PUBLICATIONS

JP 2013204146 A Google Patent Translation (Year: 2020).*
(Continued)

*Primary Examiner* — Alexander W Keeling
(74) *Attorney, Agent, or Firm* — Oliff PLC

(57) ABSTRACT

A diaphragm includes a porous supporting body and a polymer porous membrane. When one of surfaces of the
(Continued)

porous membrane is defined as a surface A, the other surface opposite to the surface A is defined as a surface B, a section of the porous membrane parallel to the surfaces A and B is defined as a section C, an average pore diameter on the surface A is defined as an average pore diameter $D_A$, an average pore diameter on the surface B is defined as an average pore diameter $D_B$, and an average pore diameter on the section C is defined as an average pore diameter $D_C$, the average pore diameters $D_A$ and $D_B$ are substantially equal to each other, and the average pore diameter $D_C$ is larger than each of the average pore diameters $D_A$ and $D_B$.

9 Claims, 4 Drawing Sheets

(56) References Cited

U.S. PATENT DOCUMENTS

| | | |
|---|---|---|
| 2013/0337368 A1 | 12/2013 | Doyen et al. |
| 2014/0332403 A1* | 11/2014 | Carrilero Borbujo ................. H01M 8/1025 205/628 |

FOREIGN PATENT DOCUMENTS

| | | |
|---|---|---|
| JP | 2011-025110 A | 2/2011 |
| JP | 2011-524606 A | 9/2011 |
| JP | 2013-204146 A | 10/2013 |
| JP | 2013204146 A * | 10/2013 |
| JP | 2014-129563 A | 7/2014 |

OTHER PUBLICATIONS

Jan. 30, 2019 European Search Report issued in European Patent Application No. 16811182.1.

Jul. 5, 2016 International Search Report issued in International Patent Application No. PCT/JP2016/002378.

* cited by examiner

ALKALINE WATER ELECTROLYSIS DIAPHRAGM AND METHOD OF MANUFACTURING SAME

TECHNICAL FIELD

The present invention relates to an alkaline water electrolysis diaphragm for use in an alkaline water electrolytic apparatus and a method of manufacturing the alkaline water electrolysis diaphragm.

BACKGROUND ART

An alkaline water electrolytic apparatus configured to generate oxygen and hydrogen from water has been known. Typically, the alkaline water electrolytic apparatus includes one or more electrolysis units. For example, the electrolysis unit of the alkaline water electrolytic apparatus described in PTL 1 includes: an electrolyzer; an alkali aqueous solution, such as a potassium hydroxide (KOH) aqueous solution, stored in the electrolyzer; two mesh-like electrodes immersed in the alkali aqueous solution; a diaphragm held so as to be sandwiched between the two electrodes and having ion permeability; two power supply electrodes configured to supply electric power to the respective electrodes; and plate spring-shaped electrically-conductive members through which the power supply electrodes are electrically connected to the electrodes. In the alkaline water electrolytic apparatus, when a voltage is applied between the electrodes by supplying the electric power from the power supply electrodes through the electrically-conductive members to the electrodes, hydrogen is generated at a cathode side of the electrolyzer, and oxygen is generated at an anode side of the electrolyzer.

As an alkaline water electrolysis diaphragm included in the alkaline water electrolytic apparatus, for example, PTL 2 proposes an alkaline water electrolysis diaphragm including: a sheet-shaped porous supporting body; and a single-phase porous membrane stacked on one or each of both surfaces of the porous supporting body and containing organic polymer resin.

CITATION LIST

Patent Literature

PTL 1: Japanese Laid-Open Patent Application Publication No. 2008-144262
PTL 2: Japanese Laid-Open Patent Application Publication No. 2014-129563

SUMMARY OF INVENTION

Technical Problem

The alkaline water electrolysis diaphragm is required to have properties that are a gas barrier property (1), ion permeability (2), mechanical strength (3), and an electrical insulation property (4).

The gas barrier property (1) denotes that only ions are allowed to pass through the diaphragm, but generated gases are not allowed to pass through and be diffused through the diaphragm. The gas barrier property (1) is important to collect highly-pure hydrogen and oxygen. It is thought that the gas barrier property is influenced by a pore diameter and porosity of a porous structure of the diaphragm. The ion permeability (2) influences electrolysis efficiency of the alkaline water electrolytic apparatus to which the diaphragm is applied. As the ion permeability increases, electrical resistance of the diaphragm decreases, and this can improve the electrolysis efficiency of the alkaline water electrolytic apparatus. It is thought that the ion permeability is influenced by the pore diameter and porosity of the porous structure of the diaphragm. As the mechanical strength (3), abrasion resistance to friction between the diaphragm and an electrode is required. The electrical insulation property (4) is a property of a typical polymer porous membrane.

The present invention was made in consideration of these circumstances, and an object of the present invention is to provide an alkaline water electrolysis diaphragm having the above properties (1) to (4), i.e., the gas barrier property, the ion permeability, the mechanical strength, and the electrical insulation property.

Solution to Problem

An alkaline water electrolysis diaphragm according to one aspect of the present invention is an alkaline water electrolysis diaphragm separating an anode chamber and a cathode chamber of an alkaline water electrolyzer, the alkaline water electrolysis diaphragm including: a sheet-shaped porous supporting body; and a porous membrane containing organic polymer resin and impregnated in the supporting body from one of surfaces of the supporting body, wherein:

(i) a thickness of the porous membrane is larger than a thickness of the supporting body;

(ii) when one of membrane surfaces of the porous membrane is defined as a surface A, the other membrane surface of the porous membrane opposite to the surface A is defined as a surface B, a section of the porous membrane parallel to the surfaces A and B is defined as a section C, an average pore diameter of the porous membrane on the surface A is defined as an average pore diameter $D_A$, an average pore diameter of the porous membrane on the surface B is defined as an average pore diameter $D_B$, and an average pore diameter of the porous membrane on the section C is defined as an average pore diameter $D_C$, the section C having the average pore diameter $D_C$ that is larger than each of the average pore diameters $D_A$ and $D_B$ which are substantially equal to each other is included in the porous membrane; and (iii) when a section or surface parallel to the surfaces A and B of the porous membrane is defined as a surface S, and an average pore diameter of the porous membrane on the surface S is defined as an average pore diameter $D_S$, the surface S having the average pore diameter $D_S$ that is not less than the average pore diameter $D_A$ or $D_B$ and smaller than a lower limit of a bubble diameter distribution of bubbles generated in the alkaline water electrolyzer is included in an impregnated region that is a region of the porous membrane and is impregnated in the supporting body.

In the above alkaline water electrolysis diaphragm, the surface S having the average pore diameter $D_S$ smaller than the lower limit of the bubble diameter distribution of the bubbles generated in electrolysis is supported by the supporting body to have mechanical strength with respect to friction. Therefore, by the surface S included in the porous membrane, the diaphragm can secure the gas barrier property by which the bubbles generated by the electrolysis cannot penetrate the diaphragm.

In the above alkaline water electrolysis diaphragm, a thickness-direction intermediate portion of the porous membrane includes the section C having the larger average pore diameter than each of the surfaces A and B. The pores of the section C are more easily filled with an electrolytic solution than the pores of the surfaces A and B. As above, since the section C is included in the porous membrane, the alkaline water electrolysis diaphragm can obtain high ion permeability. In addition, the alkaline water electrolysis diaphragm has the electrical insulation property by the polymer porous membrane.

Therefore, the present invention can provide the alkaline water electrolysis diaphragm having the gas barrier property, the ion permeability, the mechanical strength, and the electrical insulation property.

In the above alkaline water electrolysis diaphragm, it is desirable that the porous membrane be impregnated in the supporting body from the one surface of the supporting body to the other surface of the supporting body.

With this, the diaphragm can obtain the mechanical strength while suppressing the thickness of the diaphragm.

In the above alkaline water electrolysis diaphragm, the surface B of the porous membrane and the other surface of the supporting body may be substantially in flush with each other.

The other surface of the supporting body may be located on a flat surface which is parallel to the surface B and is included within a range from the surface B of the porous membrane to a position where the other surface of the supporting body is retreated from the surface B of the porous membrane in a thickness direction by not more than 5% of the thickness of the porous membrane. Or, the other surface of the supporting body may be located on a flat surface which is parallel to the surface B and is included within a range from the surface B of the porous membrane to a position where the other surface of the supporting body is advanced from the surface B of the porous membrane in a thickness direction by not more than a fiber diameter of the supporting body. In these cases, the surface B of the porous membrane and the other surface of the supporting body can be regarded as being substantially in flush with each other.

With this, the smooth porous membrane appears on both surfaces of the diaphragm, so that suppression of attaching of bubbles to the surface of the diaphragm during the electrolysis is expected. Therefore, the electrolysis efficiency of the electrolysis using the diaphragm can be increased.

In the above alkaline water electrolysis diaphragm, it is desirable that porosity of the porous membrane be not less than 80% and not more than 90%.

With this, the diaphragm can obtain high ion permeability.

In the above alkaline water electrolysis diaphragm, it is desirable that when a section of the porous membrane parallel to the surfaces A and B is defined as a section L, and an average pore diameter of the porous membrane on the section L is defined as an average pore diameter $D_L$, the section L having the average pore diameter $D_L$ that is a largest average pore diameter of the porous membrane be included in the impregnated region of the porous membrane.

As above, since the section L having the largest average pore diameter in the porous membrane is supported by the supporting body, the diaphragm can secure high ion permeability.

In the above alkaline water electrolysis diaphragm, the organic polymer resin may be at least one selected from the group consisting of polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide.

With this, the alkaline water electrolysis diaphragm can obtain the required gas barrier property and ion permeability.

In the above alkaline water electrolysis diaphragm, the supporting body may be nonwoven fabric, woven fabric, or composite fabric of nonwoven fabric and woven fabric, each of which is formed by fiber of at least one selected from the group consisting of polyphenylene sulfide, polypropylene, polysulfone, polyether sulfone, polyphenyl sulfone, fluorine-based resin, polyketone, polyimide, and polyether imide.

With this, the alkaline water electrolysis diaphragm can obtain the required mechanical strength.

A method of manufacturing an alkaline water electrolysis diaphragm according to another aspect of the present invention includes: adding organic polymer resin to an organic solvent to prepare a membrane forming solution; applying the membrane forming solution to the supporting body from one of surfaces of a sheet-shaped porous supporting body such that the membrane forming solution is impregnated in the supporting body from the one surface to the other surface of the supporting body; and exposing both surfaces of the membrane forming solution applied to the supporting body to water under substantially the same condition to form a porous membrane.

According to the above, the present invention can provide the method of manufacturing the alkaline water electrolysis diaphragm having the gas barrier property, the ion permeability, and the mechanical strength as described above.

In the above method, it is desirable that the membrane forming solution be applied to the supporting body so as to exude from the other surface of the supporting body.

With this, the smooth porous membrane appears on both surfaces of the diaphragm, so that suppression of attaching of bubbles to the surface of the diaphragm during the electrolysis is expected. Therefore, the electrolysis efficiency of the electrolysis using the diaphragm can be increased.

In the above method, the organic polymer resin may be at least one selected from the group consisting of polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide.

With this, the alkaline water electrolysis diaphragm can obtain the required gas barrier property and ion permeability.

In the above method, the porous supporting body may be nonwoven fabric, woven fabric, or composite fabric of nonwoven fabric and woven fabric, each of which is formed by fiber of at least one selected from the group consisting of polyphenylene sulfide, polypropylene, polysulfone, polyether sulfone, polyphenyl sulfone, fluorine-based resin, polyketone, polyimide, and polyether imide.

With this, the alkaline water electrolysis diaphragm can obtain the required mechanical strength. Further, the alkaline water electrolysis diaphragm having a relatively large area can be manufactured.

In the above method, the organic solvent may be at least one selected from the group consisting of dimethyl sulfoxide, N-methyl-2-pyrrolidone, dimethylformamide, dimethylacetamide, and a mixture of these.

With this, the alkaline water electrolysis diaphragm can obtain the required gas barrier property and ion permeability.

Advantageous Effects of Invention

The present invention can provide the alkaline water electrolysis diaphragm having the gas barrier property, the ion permeability, and the mechanical strength.

DESCRIPTION OF EMBODIMENTS

An alkaline water electrolysis diaphragm according to the present invention is used as one component of an electrolysis cell of an alkaline water electrolytic apparatus (not shown). The following will explain an alkaline water electrolysis diaphragm (hereinafter may be simply referred to as a "diaphragm 90") according to one embodiment of the present invention.

Schematic Configuration of Alkaline Water Electrolysis Diaphragm 90

Figure 1:
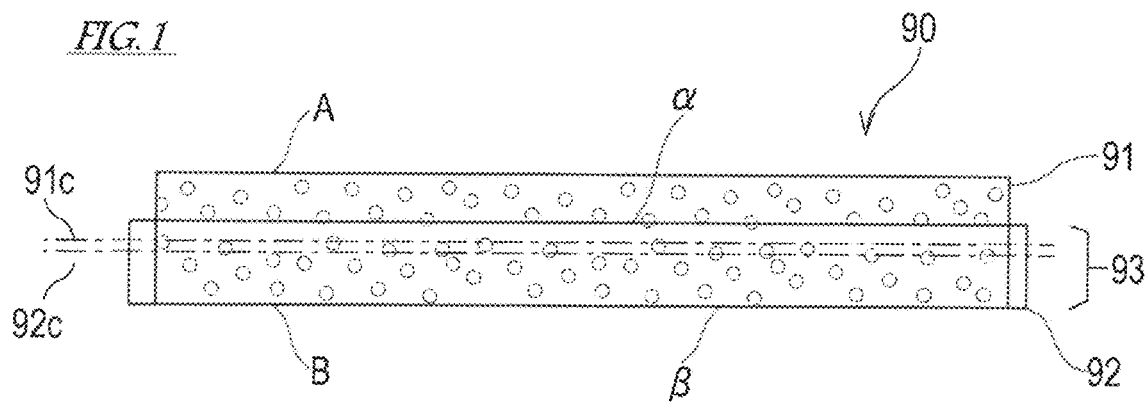
FIG. 1 is a sectional view of an alkaline water electrolysis diaphragm according to one embodiment of the present invention.
Figure 2:
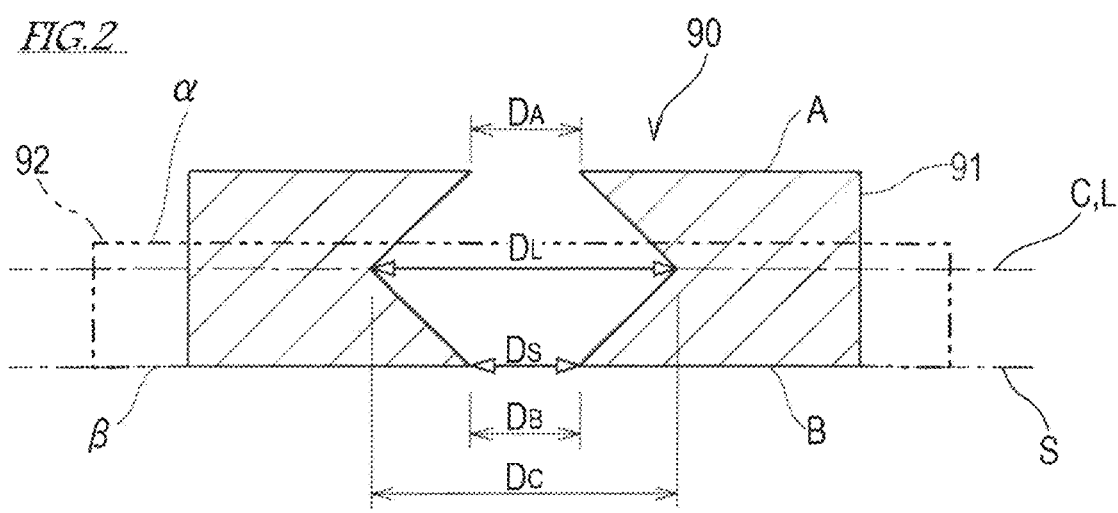
FIG. 2 is a schematic sectional view showing a distribution of average pore diameters of a porous membrane of the alkaline water electrolysis diaphragm and a positional relation between the porous membrane and a supporting body.

FIG. 1 is a sectional view of an alkaline water electrolysis diaphragm 90 according to one embodiment of the present invention. FIG. 2 is a schematic sectional view showing a distribution of average pore diameters of a porous membrane 91 of the alkaline water electrolysis diaphragm 90 and a positional relation between the porous membrane 91 and a supporting body 92. As shown in FIGS. 1 and 2, the diaphragm 90 includes: the sheet-shaped porous supporting body 92; and the polymer porous membrane 91 containing organic polymer resin. The porous membrane 91 is larger in thickness than the supporting body 92, i.e., the supporting body 92 is thinner than the porous membrane 91. The porous membrane 91 is impregnated in the supporting body 92 from one of surfaces of the supporting body 92 to the other surface, i.e., over the whole area in a thickness direction of the supporting body 92. Herein, the above term "impregnated" denotes that the porous membrane 91 gets into gaps of tissues or structures of the supporting body 92. A region of the porous membrane 91 which is impregnated in the supporting body 92 is referred to as an "impregnated region 93." The porous membrane 91 and the supporting body 92 are combined with each other by the impregnated region 93.

One of membrane surfaces of the porous membrane 91 of the diaphragm 90 (i.e., a membrane surface located at an upper side in FIGS. 1 and 2) is defined as a surface A, and the other membrane surface of the porous membrane 91 (i.e., a membrane surface located at a lower side in FIGS. 1 and 2) opposite to the surface A is defined as a surface B. Further, one of surfaces of the supporting body 92 is defined as a surface $\alpha$, and the other surface of the supporting body 92 opposite to the surface $\alpha$ is defined as a surface $\beta$. The surface $\beta$ of the supporting body 92 and the surface B of the porous membrane 91 are substantially in flush with each other. Herein, the above expression "substantially in flush with each other" denotes that: the surface $\beta$ of the supporting body 92 and the surface $\beta$ of the porous membrane 91 are in flush with each other; or the surface $\beta$ of the supporting body 92 is located on a flat surface which is parallel to the surface B and is included within a predetermined range from the surface B of the porous membrane 91 in the thickness direction.

Figure 3:
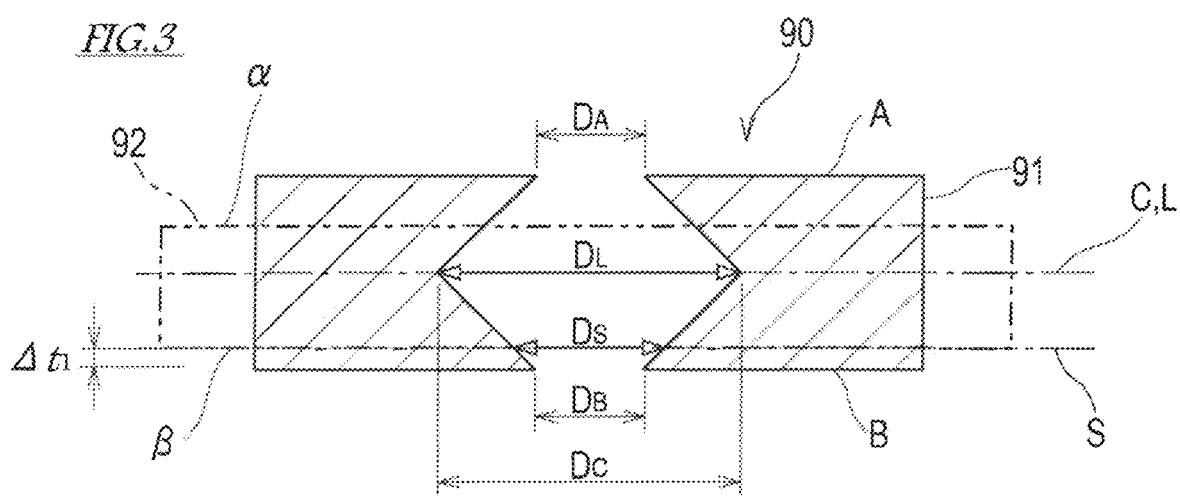
FIG. 3 is a schematic sectional view showing the positional relation between the porous membrane and the supporting body.

To be specific, the above expression "the surface $\beta$ of the supporting body 92 and the surface B of the porous membrane 91 are substantially in flush with each other" may denote that as shown in FIG. 3, the surface $\beta$ of the supporting body 92 is located on a flat surface which is parallel to the surface B and is included within a range from the surface B of the porous membrane 91 to a position where the surface $\beta$ of the supporting body 92 is retreated from the surface B of the porous membrane 91 in the thickness direction (in FIG. 3, toward an upper side) by $\Delta t1$. In the diaphragm 90 shown in FIG. 3, the surface B of the porous membrane 91 is located beyond the surface $\beta$ of the supporting body 92 in the thickness direction, and the porous membrane 91 that is denser than the supporting body 92 is exposed on both surfaces of the diaphragm 90. With this, bubbles generated by electrolysis are hardly attached to the surfaces of the diaphragm 90, and therefore, suppression of deterioration of the electrolysis efficiency is expected.

Figure 7:
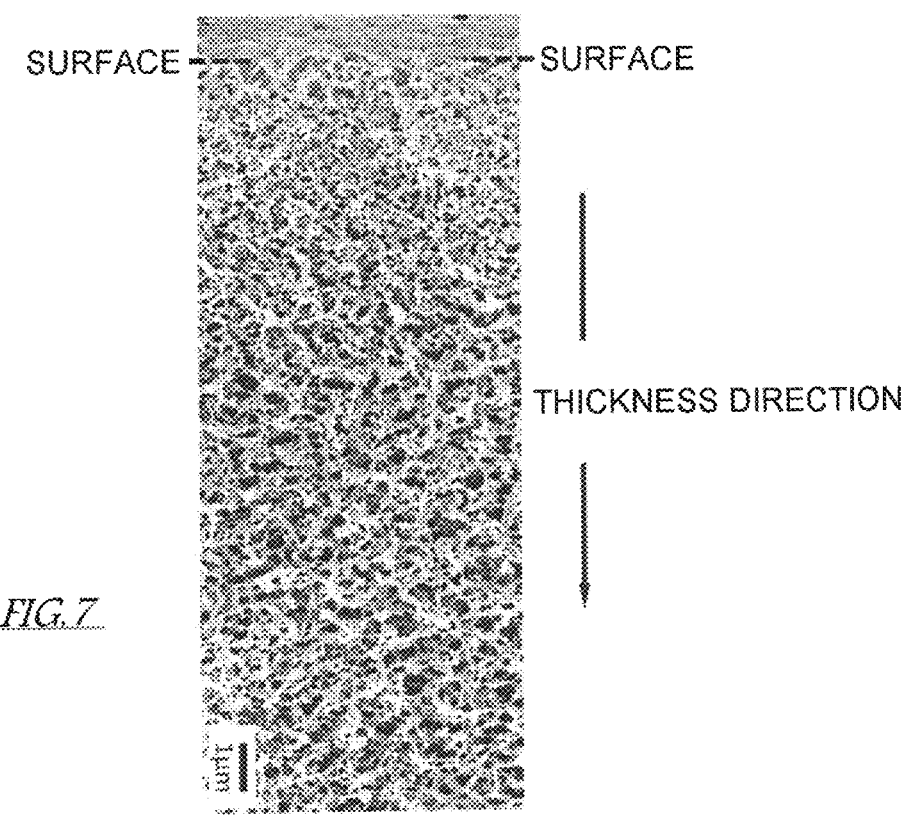
FIG. 7 is an SEM photograph showing a section of a vicinity of a surface of the porous membrane.

It is clear from the SEM photograph shown in FIG. 7 and showing the section of the vicinity of the surface of the porous membrane 91 that an increase rate of average pore diameters from the surface of the porous membrane 91 toward a thickness-direction intermediate portion is not constant. According to this photograph, it is observed that in a region extending from the surface of the porous membrane 91 toward the thickness-direction intermediate portion and having several to ten-odd micrometers (in FIG. 7, about 5 μm), the average pore diameters on sections parallel to the surface of the porous membrane 91 are substantially constant. Further, according to this photograph, it is observed that in a region located beyond the region extending from the surface of the porous membrane 91 toward the thickness-direction intermediate portion and having several to ten-odd micrometers, the average pore diameters on sections parallel to the surface of the porous membrane 91 gradually increase.

Therefore, it can be said that: the average pore diameters are substantially constant in a range extending from the surface A or B of the porous membrane 91 by several micrometers; and the average pore diameters are adequately small in a predetermined range extending from the surface A or B of the porous membrane 91. According to experiments, a range located in the vicinity of the surface of the porous membrane 91 and having substantially the same average pore diameter as the surface of the porous membrane 91 is a range extending from the surface of the porous membrane 91 by several to ten-odd micrometers (about 5% of the thickness of the membrane), although such range varies depending on the manufacturing method and material of the porous membrane 91. Based on this, the above $\Delta t1$ may be a value that is not more than about 5% of a thickness-direction size of the porous membrane 91.

Figure 4:
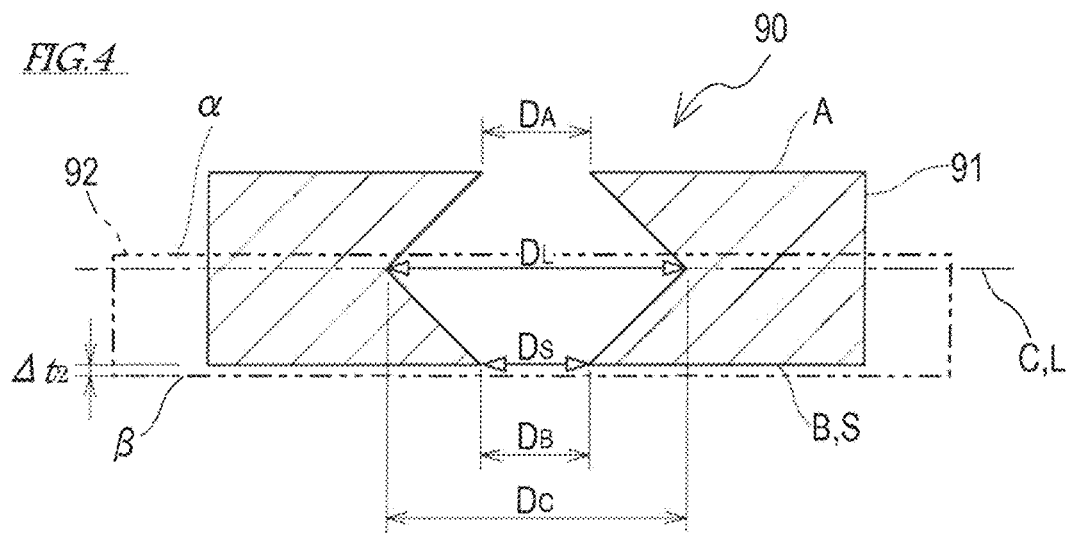
FIG. 4 is a schematic sectional view showing the positional relation between the porous membrane and the supporting body.

Further, the above expression "the surface β of the supporting body 92 and the surface B of the porous membrane 91 are substantially in flush with each other" may denote that as shown in FIG. 4, the surface β of the supporting body 92 is located on a flat surface which is parallel to the surface B and is included within a range from the surface B of the porous membrane 91 to a position where the surface 10 of the supporting body 92 is advanced from the surface B of the porous membrane 91 in the thickness direction (in FIG. 4, toward a lower side) by Δt2.

Meshes of the supporting body 92 are extremely larger than an average bubble diameter on the surface of the porous membrane 91. Therefore, even when the surface B of the porous membrane 91 is retreated from the surface β of the supporting body 92 in the thickness direction, both the surface B of the porous membrane 91 and the surface (of the supporting body 92 appear on the surface of the diaphragm 90 in some cases. One example of such cases is the diaphragm 90 in which the surface B of the porous membrane 91 is retreated from the surface β of the supporting body 92 in the thickness direction by a fiber diameter (diameter) of the supporting body 92. Based on this, the above Δt2 may be a value that is not more than the fiber diameter (diameter) of the supporting body 92. The porous membrane 91 appears on one of surfaces of the diaphragm 90 shown in FIG. 4, and the supporting body 92 and the porous membrane 91 appear on the other surface of the diaphragm 90.

In the diaphragm 90, a thickness-direction middle 92c of the supporting body 92 and a thickness-direction middle 91e of the porous membrane 91 do not coincide with each other, and the thickness-direction middle 92c of the supporting body 92 is located closer to the surface B than the thickness-direction middle 91c of the porous membrane 91.

Originally, the mechanical strength of the porous membrane 91 with respect to friction is low. However, the mechanical strength of the diaphragm 90 is secured since the porous membrane 91 is impregnated in the supporting body 92 to be supported by the supporting body 92. The mechanical strength of the diaphragm 90 increases as the thickness of the impregnated region 93 increases. However, the ion permeability of the diaphragm 90 tends to decrease as the thickness of the supporting body 92 increases. Therefore, in the diaphragm 90 according to the present embodiment, the mechanical strength and ion permeability of the diaphragm 90 are balanced in such a manner that: the supporting body 92 is formed to be smaller in thickness than the porous membrane 91; and the porous membrane 91 is impregnated in the supporting body 92 over the whole area in the thickness direction such that one of the membrane surfaces of the porous membrane 91 and one of the surfaces of the supporting body 92 are substantially in flush with each other.

Pore Diameter of Porous Membrane 91

The pore diameter of the porous membrane 91 is evaluated with a scanning electron microscope (SEM). The magnification of the SEM is adjusted such that pores, the number of which is 100 or more and 150 or less, existing on an observation target surface are displayed on a measurement image screen. An average length of a maximum length and minimum length of each of the displayed pores is calculated as an arithmetic mean. Then, an arithmetic mean of the average lengths of the pores is further calculated as an average pore diameter. The observation by the SEM is performed such that the SEM is arranged perpendicular to the observation surface of the membrane. The pore is defined as a pore that is surrounded by resin without any break. Further, a pore which is partially located outside the measurement image screen is not regarded as the pore.

As shown in FIG. 2, a section parallel to the surfaces A and B of the porous membrane 91 is defined as a section C, and the average pore diameter on the surface A is defined as $D_A$. Further, the average pore diameter on the surface B is defined as $D_B$, and the average pore diameter on the section C is defined as $D_C$. In the diaphragm 90 according to the present embodiment, the average pore diameters $D_A$ and $D_B$ are substantially equal to each other, and the average pore diameter $D_C$ is larger than each of the average pore diameters $D_A$ and $D_B$. In consideration of manufacturing errors and the like, the above expression "the average pore diameters $D_A$ and $D_B$ are substantially equal to each other" denotes that a ratio of the average pore diameter $D_B$ to the average pore diameter $D_A$ (i.e., average pore diameter $D_B$/average pore diameter $D_A$) is 0.9 to 1.1.

The average pore diameters of the porous membrane 91 are not uniform in the thickness direction. Regarding the distribution of the pore diameters of the porous membrane 91, the average pore diameter of the thickness-direction intermediate portion located between the surfaces A and B is larger than the average pore diameter of the membrane surface (each of the surfaces A and B). More specifically, regarding the distribution of the pore diameters of the porous membrane 91, the average pore diameters increase from the surface A toward the thickness-direction intermediate portion, and the average pore diameters increase from the surface B toward the thickness-direction intermediate portion. It should be noted that a section having the largest average pore diameter among sections parallel to the surfaces A and B of the porous membrane 91 is not necessarily located at the thickness-direction middle 91c of the porous membrane 91. Further, the increase rate of the average pore diameters from the surface A or B toward the thickness-direction intermediate portion is not necessarily constant.

In alkaline water electrolysis, when a voltage is applied between electrodes, hydrogen is generated on the surface of a cathode, and oxygen is generated on the surface of an anode. It is known that a bubble diameter distribution of these electrode generated gases (microbubbles) is about 2 to 30 μm although it varies depending on an electrode diameter, the amount of bubbles generated, surface tension of an electrolytic solution on an electrode surface, and the like. The gas barrier property of the diaphragm 90 is expressed in accordance with the size of the smallest pore diameter of the porous membrane 91 in the thickness direction. To be specific, the required gas barrier property of the diaphragm 90 can be expressed when at least a part of the porous membrane 91 in the thickness direction includes a section or surface having the pore diameter smaller than a lower limit (i.e., 2 μm) of the bubble diameter distribution of the electrode generated gas. Then, by increasing the pore diameters of the other part of the porous membrane 91, the ion permeability of the diaphragm 90 can be improved.

When a section or surface parallel to the surfaces A and B of the porous membrane 91 is defined as a surface S, and the average pore diameter on the surface S is defined as $D_S$, the surface S having the average pore diameter $D_S$ is included in the impregnated region 93, the average pore diameter $D_S$ being not less than the average pore diameter $D_A$ or $D_B$ and being smaller than the lower limit of the bubble diameter distribution of the bubbles generated in an alkaline water electrolyzer. If the average pore diameter $D_S$ is excessively small (for example, less than 0.01 μm), the structure of the porous membrane 91 becomes excessively dense, and the ion permeability may deteriorate. Based on this, it is desirable that the average pore diameter $D_S$ on the surface S be a value selected from a range of 0.01 to 2 nm.

In the porous membrane 91 of the diaphragm 90 shown in FIG. 2, the average pore diameters on the surfaces A and B, the sections close to the surface A, and the sections close to the surface B are smaller than the average pore diameters of the other portion of the porous membrane 91. It should be noted that each of the sections close to the surface A and the sections close to the surface B denotes a section that is parallel to the surfaces A and B, is adequately close to the surface A or B, and has the average pore diameter substantially equal to the average pore diameter of each of the surfaces A and B.

In the diaphragm 90 shown in FIG. 2, each of both the average pore diameters $D_A$ and $D_B$ is adequately smaller than the lower limit of the bubble diameter distribution of the electrode generated gas, and the surface B of the porous membrane 91 is included in the impregnated region 93. Therefore, the surface B of the porous membrane 91 satisfies the requirements of the surface S. The mechanical strength of the impregnated region 93 of the porous membrane 91 with respect to friction is higher than that of the other portion of the porous membrane 91. Therefore, the pores in the impregnated region 93 are hardly damaged and hardly deform. On this account, even when a mechanical load is applied to the diaphragm 90, the average pore diameter $D_S$ smaller than the lower limit of the bubble diameter distribution of the electrode generated gas is maintained on at least a part (surface S) of the porous membrane 91. To be specific, the diaphragm 90 can secure the gas barrier property by which the bubbles generated by the electrolysis cannot penetrate the diaphragm 90.

Further, in the diaphragm 90, a section of the porous membrane 91 parallel to the surfaces A and B is defined as a section L, and the average pore diameter on the section L is defined as a largest average pore diameter $D_L$ of the porous membrane 91. In this diaphragm 90, the section L is included between the surfaces A and B in the thickness direction and is included in the impregnated region 93. Therefore, even if a mechanical load is applied to the diaphragm 90, the largest average pore diameter $D_L$ of the porous membrane 91 is maintained. To be specific, the diaphragm 90 can secure high ion permeability in the alkaline water electrolysis.

Material of Porous Membrane 91

The porous membrane 91 of the diaphragm 90 contains organic polymer resin. The organic polymer resin is at least one selected from the group consisting of polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide.

Polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide are preferable since these adequately have chemical strength (heat resistance and alkali resistance) required for the alkaline water electrolysis diaphragm 90, and the gas barrier property and ion permeability required for the alkaline water electrolysis diaphragm 90 may be realized.

In addition to the above organic polymer resin, the porous membrane 91 may further contain a hydrophilic inorganic material selected from titanium oxide ($TiO_2$), zirconium oxide ($ZrO_2$), and a mixture of titanium oxide ($TiO_2$) and zirconium oxide ($ZrO_2$). When the porous membrane 91 contains the hydrophilic inorganic material, further improvement of the ion permeability of the diaphragm 90 is expected.

The thickness of the porous membrane 91 is not especially limited but is preferably 80 to 600 μm and more preferably 150 to 350 m. When the thickness of the porous membrane 91 is 80 μm or more, the adequate gas barrier property is obtained, and the porous membrane 91 does not break by small impact, and therefore, the supporting body 92 is not exposed. When the thickness of the porous membrane 91 is 600 μm or less, the permeability of the ions is not inhibited by resistance of the solution contained in the pores, and excellent ion permeability can be achieved.

Further, it is desirable that porosity of the porous membrane 91 be not less than 80% and not more than 90%. When the porosity of the porous membrane 91 is not less than 80%, the diaphragm 90 can obtain excellent ion permeability. If the porosity of the porous membrane 91 exceeds 90%, the mechanical strength of the porous membrane 91 with respect to friction may significantly deteriorate. The porosity can be obtained by the following formula.

Porosity (%)=[1−(Weight of Dry Membrane)/(Weight of Material Corresponding to Volume of Membrane)]×100

In the above formula, "Weight of Dry Membrane" denotes the weight of only the porous membrane 91, and the supporting body 92 is not included. Further, "Weight of Material Corresponding to Volume of Membrane" denotes the weight of the material corresponding to the volume of only the porous membrane 91, and the supporting body 92 is not included.

When the porosity of the porous membrane 91 satisfies the above condition, the improvement of the ion permeability is expected. The porosity of the porous membrane 91 is much larger than that of an existing alkaline water electrolysis diaphragm. However, the mechanical strength of the diaphragm 90 is secured since the porous membrane 91 is supported by the supporting body 92.

Material of Supporting Body 92

The supporting body 92 of the diaphragm 90 is nonwoven fabric, woven fabric, or composite fabric of nonwoven fabric and woven fabric, each of which is formed by fiber of at least one selected from the group consisting of polyphenylene sulfide, polypropylene, polysulfone, polyether sulfone, polyphenyl sulfone, fluorine-based resin, polyketone, polyimide, and polyether imide. For example, the composite fabric may be such that woven fabric is included in nonwoven fabric.

Each of polyphenylene sulfide, polypropylene, polysulfone, polyether sulfone, polyphenyl sulfone, fluorine-based resin, polyketone, polyimide, and polyether imide is high in mechanical strength and has the insulation property, the heat resistance, and the alkali resistance. Therefore, the nonwoven fabric, the woven fabric, and the composite fabric, each formed by the fiber of at least one selected from the above group adequately have the mechanical strength and chemical strength required for the diaphragm 90 of the alkaline water electrolytic apparatus. Thus, these are preferable as the material of the supporting body 92. By using the supporting body 92 made of the above material, easiness of manufacture of the diaphragm 90 can be improved.

A fiber basis weight (the weight of the fiber per unit area; $g/m^2$) of the supporting body 92 is preferably 20 to 200 $g/m^2$ and more preferably 40 to 100 $g/m^2$. The diaphragm 90 including the supporting body 92 having the fiber basis weight of less than 20 $g/m^2$ cannot obtain excellent gas barrier property. Further, the diaphragm 90 including the supporting body 92 having the fiber basis weight of more than 200 g/m² may cause inadequate electrolysis efficiency and membrane formation failure.

Method of Manufacturing Alkaline Water Electrolysis Diaphragm

The alkaline water electrolysis diaphragm 90 is manufactured in such a manner that the porous membrane 91 containing the organic polymer resin is formed at the supporting body 92 by a phase separation method.

Figure 5:
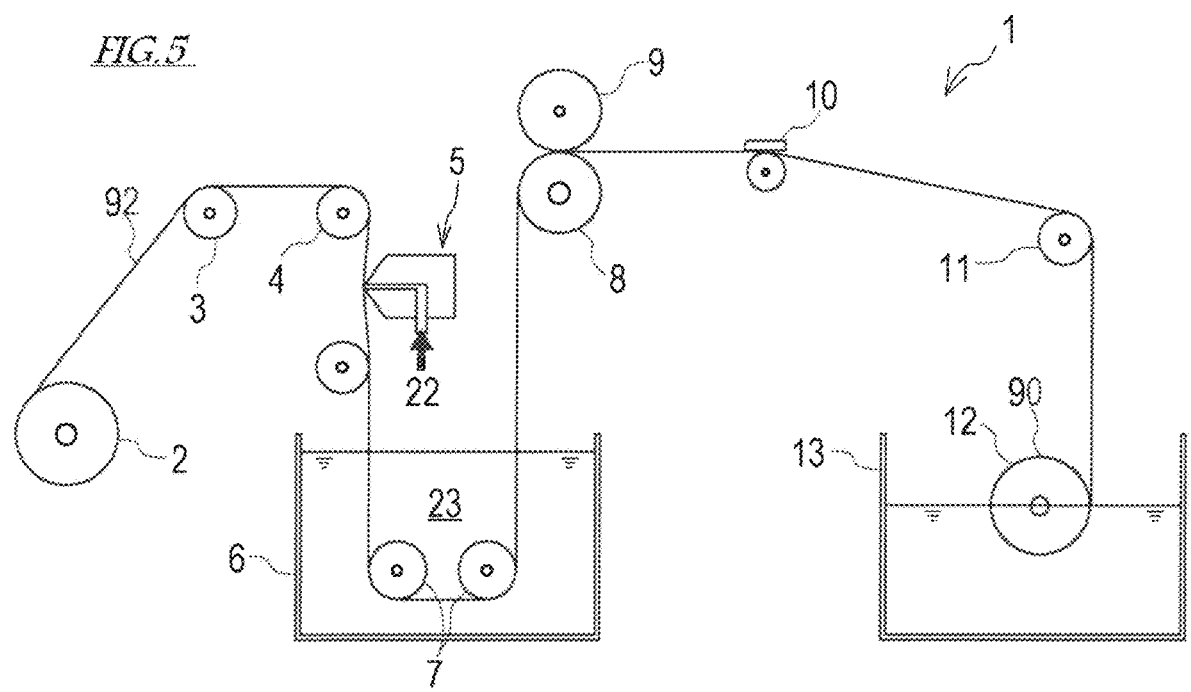
FIG. 5 is a diagram showing a schematic configuration of a manufacturing apparatus for the alkaline water electrolysis diaphragm.

First, one example of a manufacturing apparatus 1 used for manufacturing the alkaline water electrolysis diaphragm 90 will be explained. FIG. 5 is a diagram showing a schematic configuration of the manufacturing apparatus 1 for the alkaline water electrolysis diaphragm 90. The manufacturing apparatus 1 can continuously manufacture the diaphragm 90.

The manufacturing apparatus 1 shown in FIG. 5 includes: a coating unit 5; a chemical liquid tank 6; an unwinding drum 2 that is a web roll of the supporting body 92; a winding drum 12 configured to wind the diaphragm 90 (product); and a water tank 13 in which the winding drum 12 is immersed in water for maintaining a wet state of the diaphragm 90. The manufacturing apparatus 1 further includes: a plurality of guide rollers 3, 4, 7, and 11 that form a transfer pathway for the supporting body 92 and the product, the transfer pathway extending from the unwinding drum 2 through the coating unit 5 and the chemical liquid tank 6 to the winding drum 12; a driving roller 8 and nip roller 9 configured to transfer the diaphragm 90 along the transfer pathway; and a slitter 10 configured to cut the transferred diaphragm 90 into a desired size.

The coating unit 5 includes a slit through which a membrane forming solution 22 flows out. The coating unit 5 applies the membrane forming solution 22 to the surface of the moving supporting body 92 at a predetermined thickness. The coating unit 5 can apply the membrane forming solution 22 to one selected surface of the supporting body 92. Further, the coating unit 5 can adjust the degree of impregnation of the membrane forming solution 22 in the supporting body 92 (i.e., the depth of impregnation of the membrane forming solution 22 from the surface of the supporting body 92 in the thickness direction).

The membrane forming solution 22 is supplied to the coating unit 5 from a solution supply device (not shown). The membrane forming solution 22 is prepared in the solution supply device in such a manner that organic polymer resin in powder form and an additive that acts on structures (pore diameter, pore distribution, etc.) of the porous membrane 91 are dissolved in an organic solvent.

The organic solvent of the membrane forming solution 22 needs to be an organic solvent in which the organic polymer resin contained in the porous membrane 91 can be dissolved and which has miscibility with water. For example, such organic solvent is at least one selected from the group consisting of dimethyl sulfoxide (DMSO), N-methyl-2-pyrrolidone (NMP), dimethylformamide (DMF), dimethylacetamide (DMAc), and a mixture of these.

Next, a method of manufacturing the alkaline water electrolysis diaphragm 90 by the manufacturing apparatus 1 will be explained. The membrane forming solution 22 is prepared in advance by adding the organic polymer resin to the organic solvent. In the manufacturing apparatus 1, the supporting body 92 is unwound from the unwinding drum 2 to move along the transfer pathway through the coating unit 5, the chemical liquid tank 6, the slitter 10, and the water tank 13 in this order.

In the coating unit 5, the membrane forming solution 22 is applied to one of the surfaces of the supporting body 92. In this case, the membrane forming solution 22 is applied to the supporting body 92 so as to be impregnated in the supporting body 92 from one of the surfaces to the other surface. The membrane forming solution 22 may be applied to the supporting body 92 such that the membrane forming solution 22 applied to one of the surfaces of the supporting body 92 slightly exudes from the other surface. Thus, coatings of the membrane forming solution 22 are formed on both surfaces of the supporting body 92. It should be noted that the thickness of the diaphragm 90 as the product is adjusted by the thickness of the membrane forming solution 22 applied to the supporting body 92.

Next, in the chemical liquid tank 6, the supporting body 92 to which the membrane forming solution 22 is applied is immersed in a chemical liquid 23. The chemical liquid 23 (nonsolvent) may be water. Both surfaces of the membrane forming solution 22 applied to the supporting body 92 are exposed to water under substantially the same condition. For example, both surfaces of the membrane forming solution 22 applied to the supporting body 92 can be exposed to water under substantially the same condition in such a manner that the supporting body 92 is put into the chemical liquid 23 so as to be perpendicular to the surface of the chemical liquid 23. When the membrane forming solution 22 is exposed to water, phase separation of the polymer resin and the solvent occurs. When the polymer resin in the phase separation state solidifies, a porous structure (i.e., the porous membrane 91) is formed.

In the foregoing, to cause the phase separation of the membrane forming solution 22, the supporting body 92 to which the membrane forming solution 22 is applied is immersed in the chemical liquid 23. However, instead of this method, the membrane forming solution 22 applied to the supporting body 92 may be caused to contact humidified air (or water).

The supporting body 92 on which the porous membrane 91 is formed as above is then sandwiched between the driving roller 8 and the nip roller 9. Thus, the thickness of the supporting body 92 is uniformized, and excess water is removed from the supporting body 92. Then, the supporting body 92 is cut by the slitter 10 into an appropriate size and wound by the winding drum 12.

According to the above manufacturing method, since the porous membrane 91 is moved while being supported by the supporting body 92, the porous membrane 91 hardly breaks and stretches during manufacturing. Therefore, severe adjustment of a movement speed of the supporting body 92 in the manufacturing apparatus 1 is not required, and a manufacturing speed can be made higher than a conventional manufacturing speed. Further, by using a wide web roll of the supporting body 92, a diaphragm (a square shape having 2,000 mm on each side) larger than a conventionally used diaphragm can be manufactured.

EXAMPLES

Hereinafter, the present embodiment will be specifically explained using Examples and Comparative Examples. It should be noted that the present embodiment is not limited to Examples. Methods of evaluating diaphragm samples according to Examples and Comparative Example are as follows.

A. Evaluation of Pore Diameter

Figure 6:
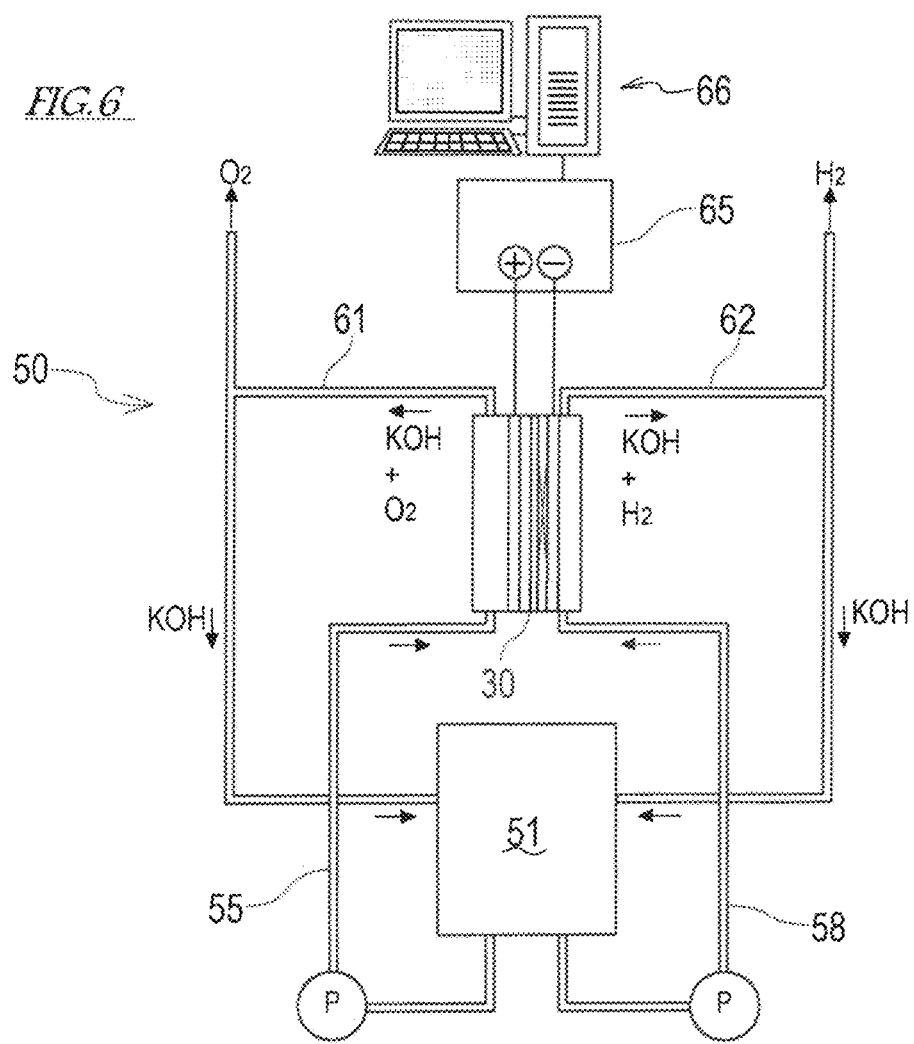
FIG. 6 is a schematic configuration diagram of a testing apparatus for properties of the alkaline water electrolysis diaphragm.

The pore diameters of the diaphragm samples were evaluated with a scanning electron microscope (SEM; field emission type scanning electron microscope JSF-7000F produced by JEOL Ltd.). First, each sample was cut to have a predetermined size and was then subjected to metal coating by a magnetron sputtering device (auto fine coater JEC-3000FC produced by JEOL Ltd.). Next, the sample was set on an observation sample table of the SEM, and measurement was started. At this time, the sample was set such that the SEM could observe the membrane from a direction perpendicular to the membrane. After the measurement was started, the magnification of the SEM was adjusted such that pores, the number of which was 100 or more and 150 or less, existing on a porous membrane surface that is an observation target were displayed on a measurement image screen. An average length of a maximum length and minimum length of each of the displayed pores was calculated as an arithmetic mean. Then, an arithmetic mean D of the average lengths of the pores was further calculated as an average pore diameter of the target membrane. The pore in this evaluation is defined as a pore that is surrounded by resin without any break. Further, a pore which is partially located outside the measurement image screen is not regarded as the pore. Regarding the section C of the porous membrane 91, freeze-fracture was performed in a direction parallel to the surface A at a position located between the surfaces A and B and away from the surface A by 200 μm in the thickness direction. This section was observed in the same manner as the above surface B. Evaluation of Properties Properties of the diaphragm samples according to Examples and Comparative Examples were evaluated based on measurement results of electrolysis voltages, hydrogen concentration in generated oxygen, and oxygen concentration in generated hydrogen, which were measured by a testing apparatus 50 schematically shown in FIG. 6. As shown in FIG. 6, the testing apparatus 50 includes an electrolysis cell 30, an electrolytic solution storage tank 51, a DC power supply device 65, a computer 66, and the like. A KOH aqueous solution that is an electrolytic solution is produced and stored in the electrolytic solution storage tank 51. The electrolytic solution is supplied from the electrolytic solution storage tank 51 through a pipe 55 to an anode chamber 48 of the electrolysis cell 30. Further, the electrolytic solution is supplied from the electrolytic solution storage tank 51 through a pipe 58 to a cathode chamber 49 of the electrolysis cell 30. By control of the computer 66, a predetermined DC current flows from the DC power supply device 65 to each electrode of the electrolysis cell 30. Although not shown, the testing apparatus 50 includes: a voltmeter configured to measure a voltage between the anode and cathode of the electrolysis cell 30; and an overvoltage measuring device configured to measure an oxygen overvoltage and a hydrogen overvoltage. Measurement results of the voltmeter and the overvoltage measuring device are analyzed by the computer 66. Oxygen is generated by water electrolysis in the anode chamber 48 of the electrolysis cell 30, and the KOH aqueous solution and the oxygen are discharged from the anode chamber 48 through a pipe 61. Hydrogen is generated by water electrolysis in the cathode chamber 49 of the electrolysis cell 30, and the KOH aqueous solution and the hydrogen are discharged from the cathode chamber 49 through a pipe 62. The oxygen concentration of the discharged hydrogen and the hydrogen concentration of the discharged oxygen are measured with a gas chromatograph analyzer (not shown; GC-14B produced by Shimadzu Corporation).

The electrolytic solution (KOH aqueous solution) supplied from the electrolytic solution storage tank 51 to the electrolysis cell 30 had a concentration of 25 wt. % and a temperature of 80° C. Regarding the electrodes of the testing apparatus, a pure nickel mesh was used as the anode 31a, and an active cathode for hydrogen generation was used as the cathode 32a. An electrolysis area of the electrolysis cell 30 was 1 dm$^2$. The electrolysis voltage, the hydrogen concentration in the generated oxygen, the oxygen concentration in the generated hydrogen, the oxygen overvoltage, and the hydrogen overvoltage, which were necessary for causing a cell current of 0.4 A/cm$^2$ to flow from the power supply device 65 to the electrolysis cell 30, were measured with the testing apparatus 50 having the above configuration. Although the electrolysis voltage measured in the electrolysis test continuously rose and fell, an average value of measured values was regarded as the electrolysis voltage. Further, a standard deviation σ of the electrolysis voltage was calculated, and 3σ was regarded as fluctuation of the electrolysis voltage (i.e., rise and fall of the electrolysis voltage).

Example 1

A membrane forming solution shown below was prepared by stirring polysulfone (Udel P (trademark) produced by Solvay Advanced Polymers LLC), polyethylene oxide (average My of 100,000; produced by Sigma-Aldrich Japan), and N-methyl-2-pyrrolidone (produced by Tokyo Chemical Industry Co., Ltd.) at a temperature of 70° C.

Polysulfone: 17 wt. %
Polyethylene oxide: 5 wt. %
N-methyl-2-pyrrolidone: 78 wt. %

The membrane forming solution was applied to PPS nonwoven fabric (Torcon paper (trademark) produced by Toray Industries, Inc.) that is the supporting body so as to have a total membrane thickness of about 300 μm. Immediately after the application, the supporting body was immersed in pure water of 40° C. in a chemical liquid tank (solidifying bath) so as to be perpendicular to the surface of the water. Thus, the phase separation and solidification of the organic polymer resin were performed. Then, the supporting body was washed well with pure water for removing the organic solvent. Thus, the diaphragm sample according to Example 1 was prepared.

Comparative Example 1

The diaphragm sample according to Comparative Example 1 was prepared in the same manner as Example 1 except that: after the membrane forming solution was applied to the supporting body, a fluorocarbon resin sheet (NITOFLON (trademark) No. 900UL produced by Nitto Denko Corporation; Width of 300 mm, Thickness of 0.1 mm) was attached to one surface of the supporting body; and immediately after that, the supporting body was immersed in pure water of 40° C. in a chemical liquid tank so as to be perpendicular to the surface of the water, and thus, the phase separation and solidification of the organic polymer resin were performed. To be specific, in Comparative Example 1, the membrane forming solution applied to the supporting body was exposed to the water from only one surface.

Example 2

A membrane forming solution shown below was prepared by stirring polyether sulfone (Udel E (trademark) produced by Solvay Advanced Polymers LLC), polyethylene oxide (average My of 100,000; produced by Sigma-Aldrich Japan), and N-methyl-2-pyrrolidone (produced by Tokyo Chemical Industry Co., Ltd.) at a temperature of 70° C.

Polysulfone: 17 wt. %
Polyethylene oxide: 3 wt. %
N-methyl-2-pyrrolidone: 80 wt. %

The membrane forming solution was applied to PPS nonwoven fabric (Torcon paper (trademark) produced by Toray Industries, Inc.) that is the supporting body so as to have a total membrane thickness of about 300 μm. Immediately after the application, the supporting body was immersed in pure water of 40° C. in a chemical liquid tank (solidifying bath) so as to be perpendicular to the surface of the water. Thus, the phase separation and solidification of the organic polymer resin were performed. Then, the supporting body was washed well with pure water for removing the organic solvent. Thus, the diaphragm sample according to Example 2 was prepared.

Comparative Example 2

The diaphragm sample Comparative Example 2
The diaphragm sample according to Comparative Example 2 was prepared in the same manner as Example 2 except that: after the membrane forming solution was applied to the supporting body, a fluorocarbon resin sheet (NITOFLON (trademark) No. 900UL produced by Nitto Denko Corporation; Width of 300 mm, Thickness of 0.1 mm) was attached to one surface of the supporting body; and immediately after that, the supporting body was immersed in pure water of 40° C. in a chemical liquid tank so as to be perpendicular to the surface of the water, and thus, the phase separation and solidification of the organic polymer resin were performed. To be specific, in Comparative Example 2, the membrane forming solution applied to the supporting body was exposed to the water from only one surface. according to Comparative Example 2 was prepared in the same manner as Example 2 except that: after the membrane forming solution was applied to the supporting body, a fluorocarbon resin sheet (NITOFLON (trademark) No. 900UL produced by Nitto Denko Corporation; Width of 300 mm, Thickness of 0.1 mm) was attached to one surface of the supporting body; and immediately after that, the supporting body was immersed in pure water of 40° C. in a chemical liquid tank so as to be perpendicular to the surface of the water, and thus, the phase separation and solidification of the organic polymer resin were performed. To be specific, in Comparative Example 2, the membrane forming solution applied to the supporting body was exposed to the water from only one surface.

TABLE 1

| | | Example 1 | Comparative Example 1 | Example 2 | Comparative Example 2 |
|---|---|---|---|---|---|
| Average pore diameter | Average pore diameter $D_A$ on Surface A [μm] | 0.028 | 0.695 | 0.023 | 0.210 |
| | Average pore diameter $D_B$ on Surface B [μm] | 0.026 | 0.037 | 0.022 | 0.028 |
| | Thickness-direction middle [μm] | 0.913 | 0.647 | 0.280 | 0.255 |
| Average pore diameter $D_B$/ Average pore diameter $D_A$ | | 0.925 | 0.053 | 0.993 | 0.133 |
| Thickness of diaphragm [μm] | | 245 | 267 | 239 | 282 |
| Porosity of porous membrane portion [%] | | 89.1 | 88.0 | 87.1 | 87.7 |

TABLE 1-continued

| | | Example 1 | Comparative Example 1 | Example 2 | Comparative Example 2 |
|---|---|---|---|---|---|
| Electrolysis properties of diaphragm | Electrolysis voltage [V] | 1.81 | 1.95 | 1.79 | 1.96 |
| | Fluctuation (3σ) of electrolysis voltage [mV] | 4.5 | 18.3 | 7.2 | 13.4 |
| | Oxygen concentration in hydrogen [%] | 0.03 | 0.04 | 0.05 | 0.01 |
| | Hydrogen concentration in oxygen [%] | 0.07 | 0.13 | 0.07 | 0.28 |

Table 1 shows results of the evaluations of the pore diameters and properties of the diaphragm samples according to Example 1 and Comparative Example 1. In the diaphragm sample according to Example 1, the average pore diameters on the surfaces A and B of the porous membrane are substantially equal to each other, and the average pore diameter on the section located between the surfaces A and B in the thickness direction and parallel to the surfaces A and B is larger than each of the average pore diameters on the surfaces A and B. On the other hand, in the diaphragm sample according to Comparative Example 1, the average pore diameter on the surface A of the porous membrane is significantly larger than the average pore diameter on the surface B of the porous membrane.

It is understood from measurement results of the oxygen concentration in hydrogen and the hydrogen concentration in oxygen that the gas barrier property of the diaphragm sample according to Example 1 and the gas barrier property of the diaphragm sample according to Comparative Example 1 are hardly different from each other.

Further, it is understood from measurement results of the fluctuation of the electrolysis voltage that the fluctuation of the electrolysis voltage of the diaphragm sample according to Comparative Example 1 is significantly larger than that of the diaphragm sample according to Example 1. It is thought that a factor of the generation of the fluctuation of the electrolysis voltage is that bubbles generated at the electrode are attached to the surface of the diaphragm to block conductive paths. One of factors of an increase and decrease of the bubbles attached to the surface of the diaphragm is a diaphragm surface shape (roughness). Therefore, easiness of attaching of the bubbles to the diaphragm surface was evaluated based on the fluctuation of the electrolysis voltage in the electrolysis test.

Further, the measurement result of the electrolysis voltage of the diaphragm sample according to Example 1 was more excellent than that of the diaphragm sample according to Comparative Example 1. With this, it can be guessed that since the amount of bubbles attached to the surface of the diaphragm sample according to Example 1 is made smaller than that of the diaphragm sample according to Comparative Example 1, an increase in the electrolysis voltage in Example 1 is suppressed.

REFERENCE SIGNS LIST 1 manufacturing apparatus
2 unwinding drum
3, 4, 7, 11 guide roller
5 coating unit
6 chemical liquid tank 8 driving roller
9 nip roller
slitter
12 winding drum
13 water tank
30 electrolysis cell
48 anode chamber
49 cathode chamber
50 testing apparatus
51 electrolytic solution storage tank
90 alkaline water electrolysis diaphragm
91 porous membrane
92 porous supporting body
93 impregnated region

The invention claimed is:

1. An alkaline water electrolysis diaphragm separating an anode chamber and a cathode chamber of an alkaline water electrolyzer, the alkaline water electrolysis diaphragm comprising:
a sheet-shaped porous supporting body; and
a porous membrane containing organic polymer resin and impregnated in the supporting body, wherein:
a thickness of the porous membrane is larger than a thickness of the supporting body;
the porous membrane is impregnated in the supporting body over the entirety of the supporting body in a thickness direction of the supporting body;
a region of the porous membrane that is impregnated in the supporting body is defined as an impregnated region;
when one of membrane surfaces of the porous membrane is defined as a surface A, the other membrane surface of the porous membrane opposite to the surface A is defined as a surface B, a section of the porous membrane parallel to the surfaces A and B is defined as a section C, an average pore diameter of the porous membrane on the surface A is defined as an average pore diameter $D_A$, an average pore diameter of the porous membrane on the surface B is defined as an average pore diameter $D_B$, and an average pore diameter of the porous membrane on the section C is defined as an average pore diameter $D_C$, the section C having the average pore diameter $D_C$ that is larger than each of the average pore diameters $D_A$ and $D_B$ which are substantially equal to each other is included in the porous membrane; and
when a section or surface parallel to the surfaces A and B of the porous membrane is defined as a surface S, and an average pore diameter of the porous membrane on the surface S is defined as an average pore diameter $D_S$, the surface S having the average pore diameter $D_S$ that is not less than the average pore diameter $D_A$ or $D_B$ and smaller than 2 μm is included in the impregnated region.

2. The alkaline water electrolysis diaphragm according to claim 1, wherein a ratio of the average pore diameter $D_B$ to the average pore diameter $D_A$ is 0.925 to 1.1.

3. The alkaline water electrolysis diaphragm according to claim 1, wherein the surface B of the porous membrane and the other surface of the supporting body are substantially in flush with each other.

4. The alkaline water electrolysis diaphragm according to claim 1, wherein the other surface of the supporting body is located on a flat surface which is parallel to the surface B and is included within a range from the surface B of the porous membrane to a position where the other surface of the supporting body is retreated from the surface B of the porous membrane in a thickness direction by not more than 5% of the thickness of the porous membrane.

5. The alkaline water electrolysis diaphragm according to claim 1, wherein the other surface of the supporting body is located on a flat surface which is parallel to the surface B and is included within a range from the surface B of the porous membrane to a position where the other surface of the supporting body is advanced from the surface B of the porous membrane in a thickness direction by not more than a fiber diameter of the supporting body.

6. The alkaline water electrolysis diaphragm according to claim 1, wherein porosity of the porous membrane is not less than 80% and not more than 90%.

7. The alkaline water electrolysis diaphragm according to claim 1, wherein when a section of the porous membrane parallel to the surfaces A and B is defined as a section L, and an average pore diameter of the porous membrane on the section L is defined as an average pore diameter $D_L$, the section L having the average pore diameter $D_L$ that is a largest average pore diameter of the porous membrane is included in the impregnated region of the porous membrane.

8. The alkaline water electrolysis diaphragm according to claim 1, wherein the organic polymer resin is at least one selected from the group consisting of polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide.

9. The alkaline water electrolysis diaphragm according to claim 1, wherein the supporting body is nonwoven fabric, woven fabric, or composite fabric of nonwoven fabric and woven fabric, each of which is formed by fiber of at least one selected from the group consisting of polyphenylene sulfide, polypropylene, polysulfone, polyether sulfone, polyphenyl sulfone, fluorine-based resin, polyketone, polyimide, and polyether imide.

* * * * *